United States Patent
Eister

(12)
(10) Patent No.: US 6,386,608 B1
(45) Date of Patent: May 14, 2002

(54) BLOCK LIFT

(76) Inventor: Clifford G. Eister, 11752 Eucalyptus Hills Dr., Lakeside, CA (US) 92040

( * ) Notice: Subject to any disclaimer, the term of this patent is extended or adjusted under 35 U.S.C. 154(b) by 0 days.

(21) Appl. No.: 09/844,335

(22) Filed: Apr. 27, 2001

(51) Int. Cl.⁷ .................................................. B65G 7/12
(52) U.S. Cl. ............................ 294/62; 294/15; 294/158
(58) Field of Search .............................. 294/15–17, 26, 294/27.1, 32, 57, 62, 67.1, 67.22, 67.32, 81.53, 89, 93, 97, 158

(56) References Cited

U.S. PATENT DOCUMENTS

| 824,822 | A | | 7/1906 | Samuelson | |
|---|---|---|---|---|---|
| 1,278,100 | A | * | 9/1918 | Bruning | 294/57 X |
| 1,510,564 | A | * | 10/1924 | Stockfleth et al. | 294/67.1 X |
| 2,409,932 | A | * | 10/1946 | Dostal | 294/15 |
| 2,702,641 | A | * | 2/1955 | Arthur | 294/67.1 X |
| 2,776,792 | A | * | 1/1957 | Pearson | 294/158 X |
| 2,968,510 | A | | 1/1961 | Ellis et al. | |
| 3,203,606 | A | * | 8/1965 | Masterson | 294/15 X |
| 4,068,878 | A | * | 1/1978 | Wilner | 294/81.53 X |
| 4,297,963 | A | * | 11/1981 | Beacom | 294/93 X |
| 4,717,147 | A | * | 1/1988 | Rochelle | 294/15 X |
| 4,826,231 | A | * | 5/1989 | Bakhit | 294/15 X |
| 4,982,987 | A | * | 1/1991 | Riggins et al. | 294/15 X |
| 5,509,706 | A | | 4/1996 | Thalmann | |
| 5,704,675 | A | | 1/1998 | Reiley | |
| 5,752,730 | A | | 5/1998 | Allen | |
| D404,985 | S | | 2/1999 | Fredrickson | |

* cited by examiner

*Primary Examiner*—Johnny D. Cherry

(57) ABSTRACT

A block lift for lifting keystone type blocks. The block lift includes a plate having a top surface, a bottom surface and a peripheral edge extending between the top and bottom surfaces. A rod is elongated and has a first end and a second end. The first end is integrally coupled to the top surface of the plate and generally centered in the top surface. The rod extends upwardly from the plate. A handle is attached to the second end of the rod. The plate is positioned through an aperture in a block and turned such that the plate is moved under a bottom surface of the block. The block may then be lifted.

14 Claims, 2 Drawing Sheets

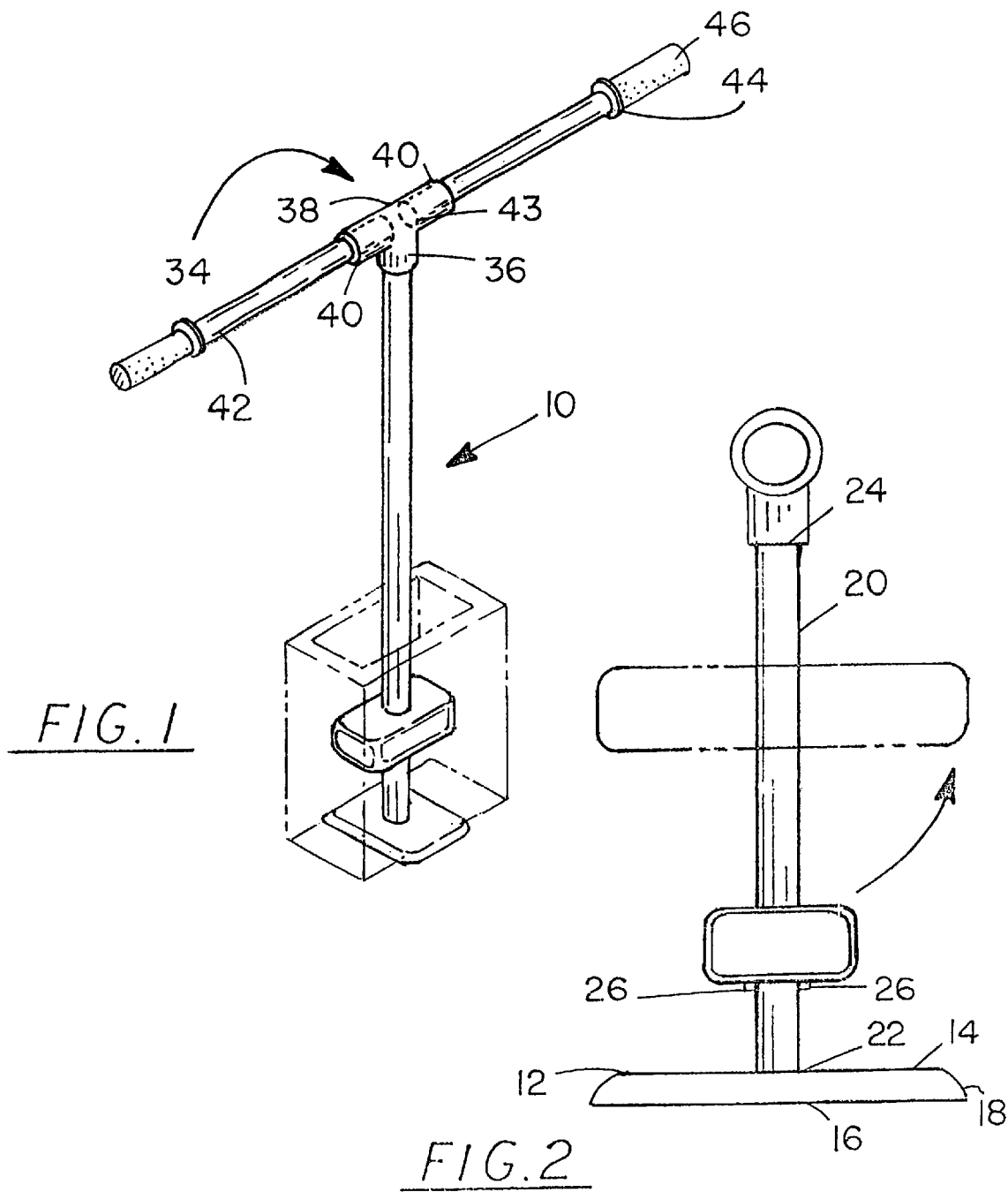

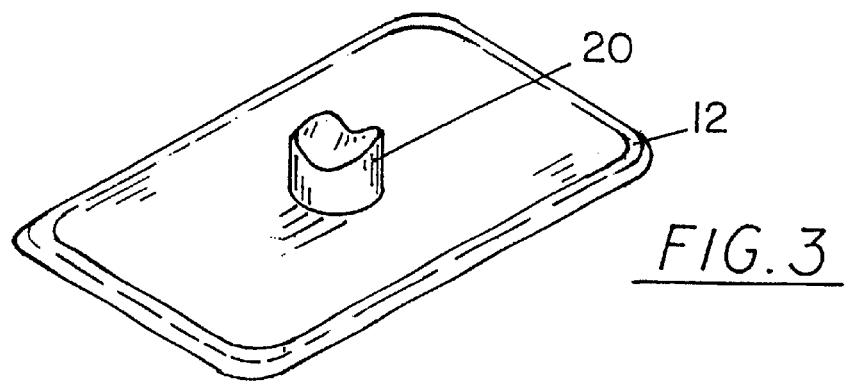
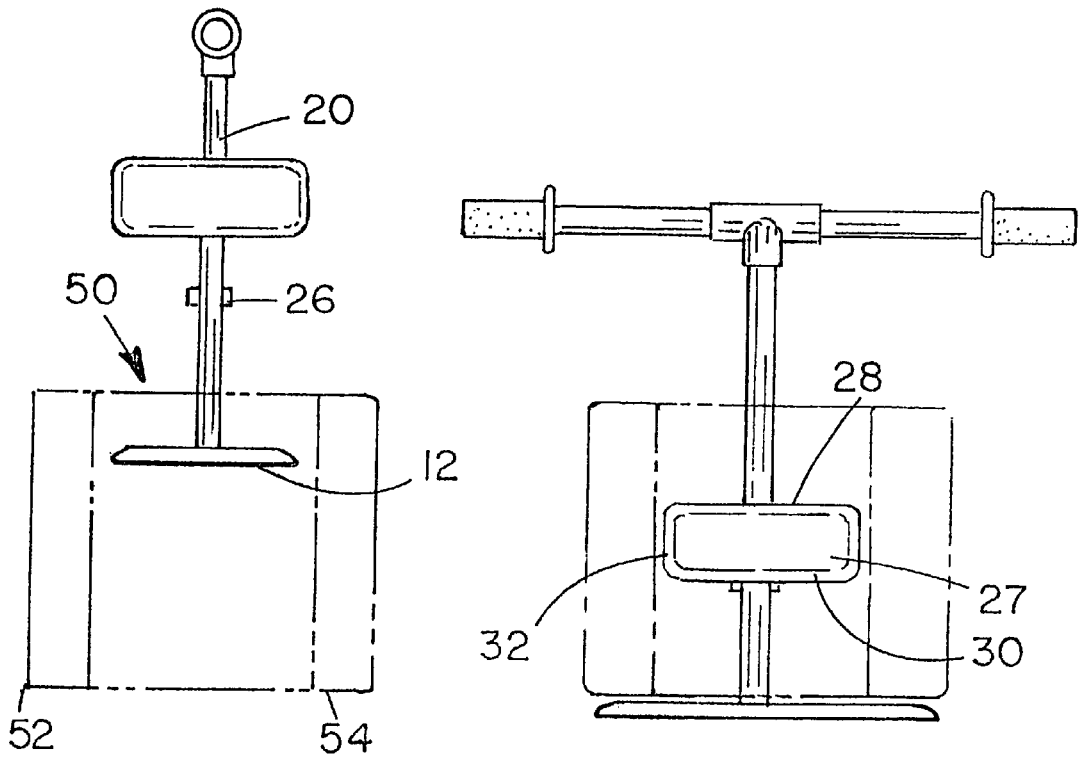
FIG. 3
FIG. 4
FIG. 5

BLOCK LIFT

BACKGROUND OF THE INVENTION

1. Field of the Invention

The present invention relates to block lifting devices and more particularly pertains to a new block lift for lifting keystone type blocks.

2. Description of the Prior Art

The use of block lifting devices is known in the prior art. More specifically, block lifting devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Patent No. 5,704,675; U.S. Pat. No. 2,968,510; U.S. Pat. No. 5,752,730; U.S. Pat. No. 5,509,706; U.S. Pat. No. 824,822; and U.S. Des. Pat. No. 404,985.

While these devices fulfill their respective, particular objectives and requirements, the aforementioned patents do not disclose a new block lift. The inventive device includes a plate having a top surface, a bottom surface and a peripheral edge extending between the top and bottom surfaces. A rod is elongated and has a first end and a second end. The first end is integrally coupled to the top surface of the plate and generally centered in the top surface. The rod extends upwardly from the plate. A handle is attached to the second end of the rod. The plate is positioned through an aperture in a block and turned such that the plate is moved under a bottom surface of the block. The block may then be lifted.

In these respects, the block lift according to the present invention substantially departs from the conventional concepts and designs of the prior art, and in so doing provides an apparatus primarily developed for the purpose of lifting keystone type blocks.

SUMMARY OF THE INVENTION

In view of the foregoing disadvantages inherent in the known types of block lifting devices now present in the prior art, the present invention provides a new block lift construction wherein the same can be utilized for lifting keystone type blocks.

The general purpose of the present invention, which will be described subsequently in greater detail, is to provide a new block lift apparatus and method which has many of the advantages of the block lifting devices mentioned heretofore and many novel features that result in a new block lift which is not anticipated, rendered obvious, suggested, or even implied by any of the prior art block lifting devices, either alone or in any combination thereof.

To attain this, the present invention generally comprises a plate having a top surface, a bottom surface and a peripheral edge extending between the top and bottom surfaces. A rod is elongated and has a first end and a second end. The first end is integrally coupled to the top surface of the plate and generally centered in the top surface. The rod extends upwardly from the plate. A handle is attached to the second end of the rod. The plate is positioned through an aperture in a block and turned such that the plate is moved under a bottom surface of the block. The block may then be lifted.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new block lift apparatus and method which has many of the advantages of the block lifting devices mentioned heretofore and many novel features that result in a new block lift which is not anticipated, rendered obvious, suggested, or even implied by any of the prior art block lifting devices, either alone or in any combination thereof.

It is another object of the present invention to provide a new block lift which may be easily and efficiently manufactured and marketed.

It is a further object of the present invention to provide a new block lift which is of a durable and reliable construction.

An even further object of the present invention is to provide a new block lift which is susceptible of a low cost of manufacture with regard to both materials and labor, and which accordingly is then susceptible of low prices of sale to the consuming public, thereby making such block lift economically available to the buying public.

Still yet another object of the present invention is to provide a new block lift which provides in the apparatuses and methods of the prior art some of the advantages thereof, while simultaneously overcoming some of the disadvantages normally associated therewith.

Still another object of the present invention is to provide a new block lift for lifting keystone type blocks.

Yet another object of the present invention is to provide a new block lift which includes a plate having a top surface, a bottom surface and a peripheral edge extending between the top and bottom surfaces. A rod is elongated and has a first end and a second end. The first end is integrally coupled to the top surface of the plate and generally centered in the top surface. The rod extends upwardly from the plate. A handle is attached to the second end of the rod. The plate is positioned through an aperture in a block and turned such that the plate is moved under a bottom surface of the block. The block may then be lifted.

Still yet another object of the present invention is to provide a new block lift that has removable handles.

Even still another object of the present invention is to provide a new block lift that has a rod stabilizer for stabilizing the device during use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new block lift according to the present invention.

FIG. 2 is a schematic side view of the present invention.

FIG. 3 is a schematic perspective view of the plate of the present invention.

FIG. 4 is a schematic side view of the present invention.

FIG. 5 is a schematic side view of the present invention.

DESCRIPTION OF THE PREFERRED EMBODIMENT

With reference now to the drawings, and in particular to FIGS. 1 through 5 thereof, a new block lift embodying the principles and concepts of the present invention and generally designated by the reference numeral 10 will be described.

As best illustrated in FIGS. 1 through 5, the block lift 10 generally comprises a plate 12 having a top surface 14, a bottom surface 16 and a peripheral edge 18 extending between the top 14 and bottom 16 surfaces. The plate 12 has a generally rectangular shape. The peripheral edge 18 tapers inward from the bottom surface 16 to the top 14 surface. The bottom surface 16 has a length substantially equal to 3½ inches and a width substantially equal to 1½ inches. The peripheral edge 18 has a height preferably equal to ¼ inch.

A rod 20 is elongated and has a first end 22 and a second end 24. The first end 20 is integrally coupled to the top surface 14 of the plate 12 and generally centered in the top surface 14. The rod 20 extends upwardly from the plate 12. The rod 20 has a length preferably between 10 inches and 12 inches.

A pair of protruding members 26 are coupled to and extend outwardly from the rod 20 in generally opposite directions. The protruding members 26 are positioned nearer the first end 22 of the rod than the second end 24 of the rod 20.

A rod stabilizer 27 has a top side 28, a bottom side 30 and a peripheral edge 32 extending between the top 28 and bottom 30 sides. The rod 20 extends through the top 28 and bottom 30 sides of the rod stabilizer 27 such that the rod stabilizer 27 is movable on the rod 20 between the second end 24 of the rod 20 and the protruding members 26. The rod stabilizer 27 has a length and width substantially equal to the length and width of the bottom surface 16 of the plate 12.

A handle 34 is attached to the second end 24 of the rod 20. The handle 34 comprises a bracket 36 attached to the second end 24 of the rod 20. The bracket 36 includes a tube 38 orientated perpendicular to the rod 20. The tube 38 has a pair of open ends 40. A pair of elongate members 42 each has a first end 43 and a second end 44. Each of the first ends 43 is extendable into one of the ends 40 of the tube 38. Each of a pair of handgrips 46 is attached to one of the second ends 44 of the elongate members 42. The handgrips 46 comprise a resiliently compressible material such as foam rubber.

In use, the plate 12 is positioned through an aperture 50 in a keystone type block 52 and turned such that the plate 12 is moved under a bottom surface 54 of the block 52. The block 52 may be lifted by two people using the handle. The elongate members 42 are removable for convenience in cramped areas. The rod stabilizer 27 stabilizes the rod 20 in the block 52. The protruding members 26 prevent the rod stabilizer 27 from interfering with the plate 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A block lifting device for lifting blocks having an aperture extending therethrough, said device comprising:

a plate having a top surface, a bottom surface and a peripheral edge extending between said top and bottom surfaces;

a rod being elongated and having a first end and a second end, said first end being integrally coupled to said top surface of said plate and generally centered in said top surface, said rod extending upwardly from said plate;

a handle being attached to said second end of said rod;

a rod stabilizer having a top side, a bottom side and a peripheral edge extending between said top and bottom sides, said rod extending through said top and bottom sides of said rod stabilizer such that said rod stabilizer is movable on said rod; and wherein said plate is positioned through said aperture and turned such that said plate is moved under a bottom surface of said block, wherein said block may be lifted.

2. The block lifting device as in claim 1, wherein said plate has a generally rectangular shape, said peripheral edge tapering inward from said bottom surface to said top surface.

3. The block lifting device as in claim 2, wherein said bottom surface has a length substantially equal to 3½ inches and a width substantially equal to 1½ inches, said peripheral edge having a height generally equal to ¼ inch.

4. The block lifting device as in claim 1, wherein said rod has a length generally between 10 inches and 12 inches.

5. The block lifting device as in claim 1, further including:
   a pair of protruding members being coupled to and extending outwardly from said rod in generally opposite directions, said protruding members being positioned nearer said first end of said rod than said second end of said rod; and
   wherein said rod stabilizer is movable on said rod between said second end of said rod and said protruding members.

6. The block lifting device as in claim 5, wherein said rod stabilizer has a length and width substantially equal to the length and width of said bottom surface of said plate.

7. The block lifting device as in claim 1, wherein said handle comprises:
   a bracket attached to said second end of said rod, said bracket including a tube orientated perpendicular to said rod, said tube having a pair of open ends;
   a pair of elongate members each having a first end and a second end, each of said first ends being extendable one of the ends of said tube.

8. The block lifting device as in claim 7, further including a pair of handgrips, each of said handgrips being attached to one of said second ends of said elongate members, said handgrips comprising a resiliently compressible material.

9. A block lifting device for lifting blocks having an aperture extending therethrough, said device comprising:
   a plate having a top surface, a bottom surface and a peripheral edge extending between said top and bottom surfaces, said plate having a generally rectangular shape, said peripheral edge tapering inward from said bottom surface to said top surface, said bottom surface having a length substantially equal to 3½ inches and a width substantially equal to 1½ inches, said peripheral edge having a height generally equal to ¼ inch;
   a rod being elongated and having a first end and a second end, said first end being integrally coupled to said top surface of said plate and generally centered in said top surface, said rod extending upwardly from said plate, said rod having a length generally between 10 inches and 12 inches;
   a pair of protruding members being coupled to and extending outwardly from said rod in generally opposite directions, said protruding members being positioned nearer said first end of said rod than said second end of said rod;
   a rod stabilizer having a top side, a bottom side and a peripheral edge extending between said top and bottom sides, said rod extending through said top and bottom sides of said rod stabilizer such that said rod stabilizer is movable on said rod between said second end of said rod and said protruding members, said rod stabilizer having a length and width substantially equal to the length and width of said bottom surface of said plate;
   a handle being attached to said second end of said rod, said handle comprising;
   a bracket attached to said second end of said rod, said bracket including a tube orientated perpendicular to said rod, said tube having a pair of open ends;
   a pair of elongate members each having a first end and a second end, each of said first ends being extendable into one of the ends of said tube;
   a pair of handgrips, each of said handgrips being attached to one of said second ends of said elongate members, said handgrips comprising a resiliently compressible material;
   wherein said plate is positioned through said aperture and turned such that said plate is moved under a bottom surface of said block, wherein said block may be lifted.

10. A block lifting device for lifting blocks having an aperture extending therethrough, said device comprising:
   a plate having a top surface, a bottom surface and a peripheral edge extending between said top and bottom surfaces, said peripheral edge tapering inward from said bottom surface to said top surface to facilitate positioning of said peripheral edge below a bottom edge of the block;
   a rod being elongated and having a first end and a second end, said first end being integrally coupled to said top surface of said plate and generally centered in said top surface, said rod extending upwardly from said plate;
   a handle being attached to said second end of said rod; and
   wherein said plate is positioned through said aperture and turned such that said plate is moved under a bottom surface of said block, wherein said block may be lifted.

11. The block lifting device as in claim 10, further including:
   a pair of protruding members being coupled to and extending outwardly from said rod in generally opposite directions, said protruding members being positioned nearer said first end of said rod than said second end of said rod; and
   a rod stabilizer having a top side, a bottom side and a peripheral edge extending between said top and bottom sides, said rod extending through said top and bottom sides of said rod stabilizer such that said rod stabilizer is movable on said rod between said second end of said rod and said protruding members.

12. The block lifting device as in claim 10, further including a rod stabilizer having a top side, a bottom side and a peripheral edge extending between said top and bottom sides, said rod extending through said top and bottom sides of said rod stabilizer such that said rod stabilizer is movable on said rod.

13. The block lifting device as in claim 10, wherein said handle includes a bracket attached to said second end of said rod, said bracket including a tube orientated perpendicular to said rod, said tube having a pair of open ends, a pair of elongate members each having a first end and a second end, each of said first ends being extendable into one of the ends of said tube.

14. The block lifting device as in claim 13, further including a pair of handgrips, each of said handgrips being attached to one of said second ends of said elongate members, said handgrips comprising a resiliently compressible material.

* * * * *